(12) United States Patent
Strawn

(10) Patent No.: US 11,731,564 B1
(45) Date of Patent: Aug. 22, 2023

(54) PICKUP TRUCK RACK

(71) Applicant: Paul W. Strawn, Olympia, WA (US)

(72) Inventor: Paul W. Strawn, Olympia, WA (US)

( * ) Notice: Subject to any disclaimer, the term of this patent is extended or adjusted under 35 U.S.C. 154(b) by 17 days.

(21) Appl. No.: 17/680,821

(22) Filed: Feb. 25, 2022

(51) Int. Cl.
*B60R 9/02* (2006.01)

(52) U.S. Cl.
CPC ..................... *B60R 9/02* (2013.01)

(58) Field of Classification Search
CPC ........... B60R 9/00; B60R 9/04; B60R 9/0423; B60R 9/06; B60P 3/40
USPC ............................................ 296/3; D12/412
See application file for complete search history.

(56) References Cited

U.S. PATENT DOCUMENTS

| | | | | |
|---|---|---|---|---|
| 4,057,281 A * | 11/1977 | Garrett | ...................... | B60P 7/00 224/42.32 |
| 4,405,170 A | 9/1983 | Raya | | |
| 4,659,131 A * | 4/1987 | Flournoy, Jr. | ............. | B60R 9/00 296/3 |
| 5,143,415 A | 9/1992 | Boudah | | |
| 5,192,107 A * | 3/1993 | Smith, Sr. | ................. | B60P 3/40 296/3 |
| 5,476,301 A * | 12/1995 | Berkich | .................... | B60R 9/00 224/403 |
| 5,628,540 A * | 5/1997 | James | ...................... | B60R 9/00 224/403 |
| 5,743,702 A * | 4/1998 | Gunderson | ........... | B60P 1/5442 224/403 |
| 5,836,635 A | 11/1998 | Dorman | | |
| 6,347,731 B1 | 2/2002 | Burger | | |
| 6,786,522 B2 * | 9/2004 | Kench, III | ................ | B60R 9/00 403/381 |
| 7,014,236 B2 | 3/2006 | Kerns | | |
| 7,258,380 B1 | 8/2007 | Aguilar | | |
| 7,419,075 B2 | 8/2008 | Green | | |
| 7,753,615 B1 * | 7/2010 | Sprague | .................... | B60P 3/40 410/32 |
| 8,662,366 B1 * | 3/2014 | DeZonia | .................. | B60R 9/04 224/403 |
| 10,421,385 B2 * | 9/2019 | Chambers | .......... | B62D 33/0207 |
| 11,325,664 B2 * | 5/2022 | Hanson | .............. | B62D 33/0207 |
| 2005/0167459 A1 * | 8/2005 | Storer | ....................... | B60R 9/00 224/405 |
| 2009/0166390 A1 * | 7/2009 | Flaherty | .................... | B60R 9/00 224/403 |
| 2010/0072237 A1 | 3/2010 | Green | | |
| 2010/0288808 A1 * | 11/2010 | Marr, Jr. | .................... | B60R 9/06 224/403 |
| 2014/0034694 A1 * | 2/2014 | Laverack | ................ | B60R 9/058 224/403 |
| 2015/0183363 A1 * | 7/2015 | Puchkoff | .................. | B60P 7/14 410/116 |

(Continued)

*Primary Examiner* — Gregory A Blankenship
(74) *Attorney, Agent, or Firm* — Clark A. Pantigam; Jenson & Puntigam P.S.

(57) ABSTRACT

A pickup truck rack having a connectable arrangement of laterally spaced top horizontal assemblies, spaced vertical bars extending downwardly from each top horizontal assembly, cross bars extending between top horizontal assemblies and first laterally spaced lower horizontal bars, extending from a rearmost vertical bar forwardly to a next rearmost vertical bar and second laterally spaced lower horizontal bars, extending from a front vertical bar rearwardly of the truck rack a distance without contacting the next rearmost vertical bar.

8 Claims, 7 Drawing Sheets

(56) References Cited

U.S. PATENT DOCUMENTS

2016/0214542 A1\* 7/2016 Rohr ..................... B60R 9/048
2017/0166105 A1\* 6/2017 Puchkoff .................. B60R 9/06

\* cited by examiner

PICKUP TRUCK RACK

TECHNICAL FIELD

This invention relates generally to truck racks for pickup trucks and more particularly concerns such a truck rack which is capable of accommodating a variety of equipment, including boats, small vehicles and construction materials.

BACKGROUND OF THE INVENTION

Pickup truck racks are well known in general; however, most pickup truck racks are limited to specific uses and carrying capacity and are cumbersome to install and remove from the pickup truck. An arrangement which can accommodate a variety of equipment and construction materials, as well as being convenient to install and remove from the pickup truck would be beneficial.

SUMMARY OF THE INVENTION

Accordingly, the present invention is a truck rack for pickup trucks, comprising: two spaced top horizontal bar assemblies extending the length of the pickup truck bed, each horizontal bar assembly comprising first and second sections; three vertical bars attached to each of the top horizontal bar assemblies and extending downwardly therefrom, the vertical bars positioned at spaced intervals along the length of the top horizontal bar assemblies; three cross bars extending between the top horizontal bar assemblies at spaced intervals there along, coplanar with the vertical bars; three attachment assemblies, the attachment assemblies each comprising an outer attachment piece, attachably securing an outer surface of each vertical bar to an outer surface of an associated top horizontal bar assembly and an inner attachment piece, attachably securing the inner surface of each vertical bar member to an inner surface of the associated top horizontal bar assembly, wherein the inner attachment piece includes an element configured to receive a free end of a cross bar; two mid-level horizontal bars extending between and connected to first and second rearmost vertical bars attached to the top horizontal bar assemblies respectively; a first lower horizontal bar extending between a lower end of each of the first rear most vertical bar forwardly to at least the second rearmost vertical bar; and a second lower horizontal bar extending rearwardly from each of the forward most vertical bar a distance rearwardly toward but not attached to the second rearmost vertical bar or the first lower horizontal bar.

BEST MODE FOR CARRYING OUT THE INVENTION

The pickup truck rack of the present invention is referred to generally at 10, used with a pickup truck shown generally at 11. The truck rack 10 is arranged and constructed in the format of a kit of individual parts which can be conveniently installed and removed as a unit when assembled and when removed can be readily disassembled in a manner to fit into a 3'×5' container which can be conveniently stored or transported. Hence, the implementation of the truck rack 10 is structurally and functionally distinguishable from known truck racks for pickup trucks.

Figure 1:
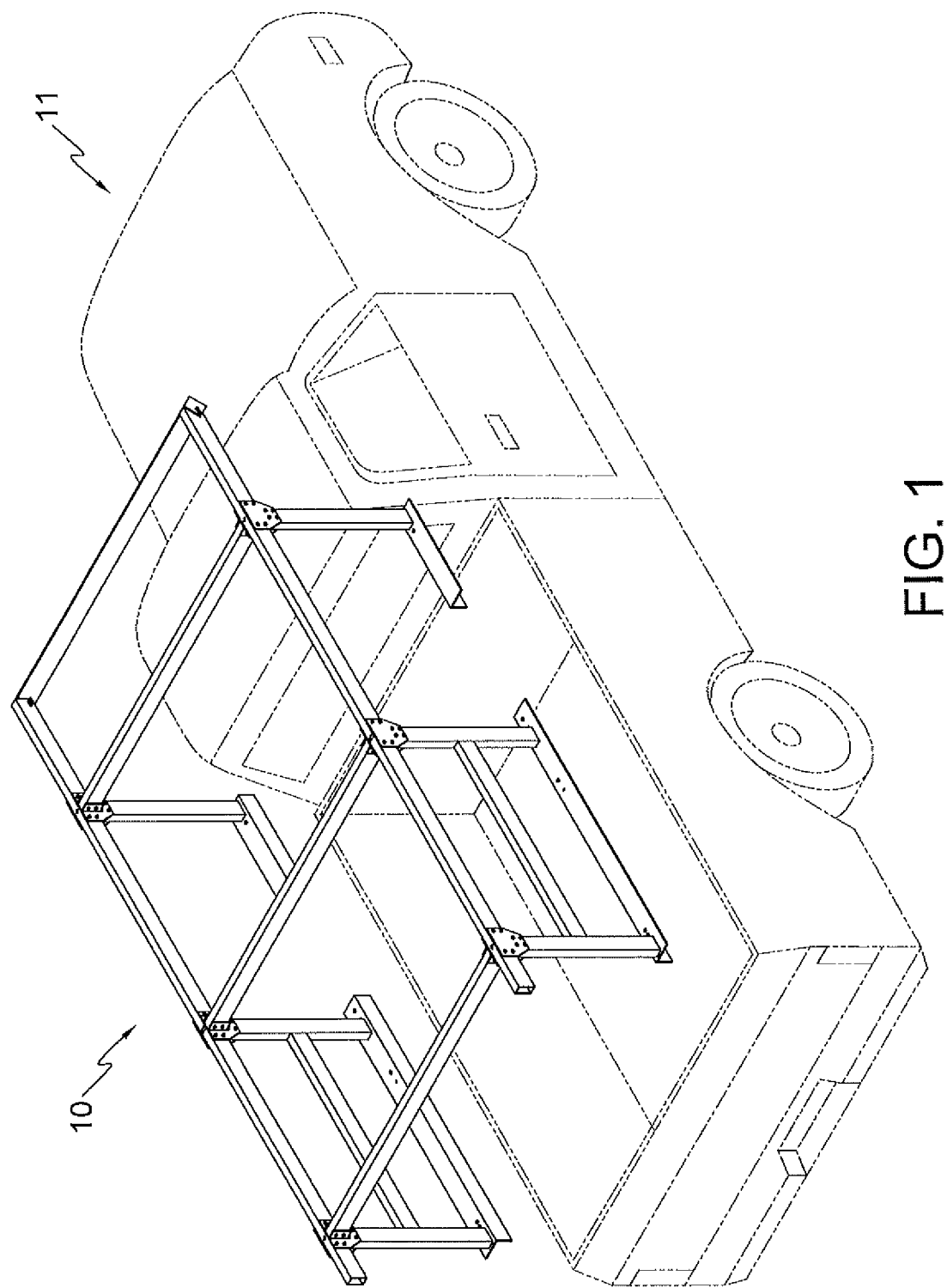
FIG. 1 is a perspective view of the truck rack of the present invention with a pickup truck.
Figure 2:
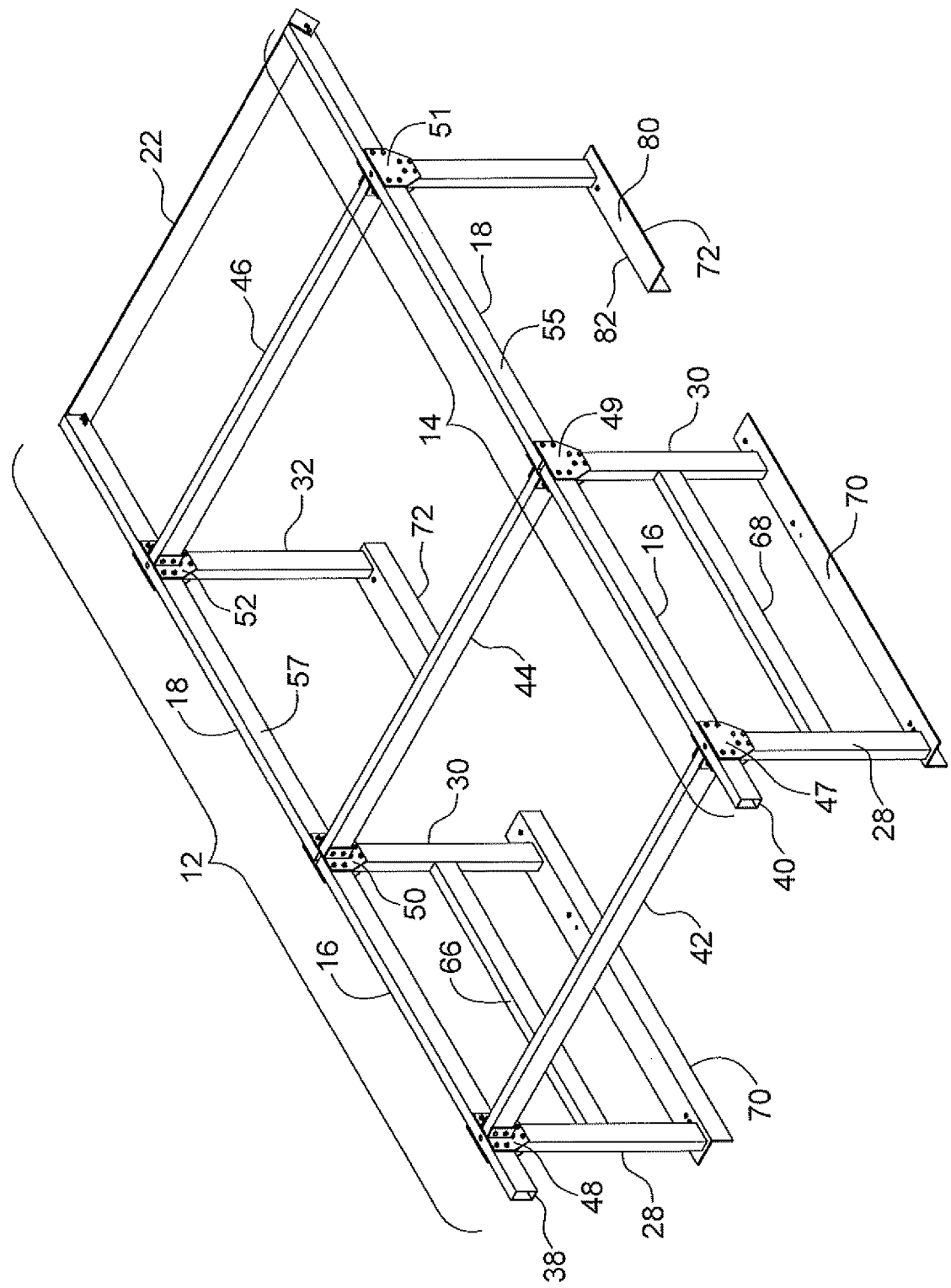
FIG. 2 is a perspective view of an assembled pickup truck rack of FIG. 1.
Figure 3:
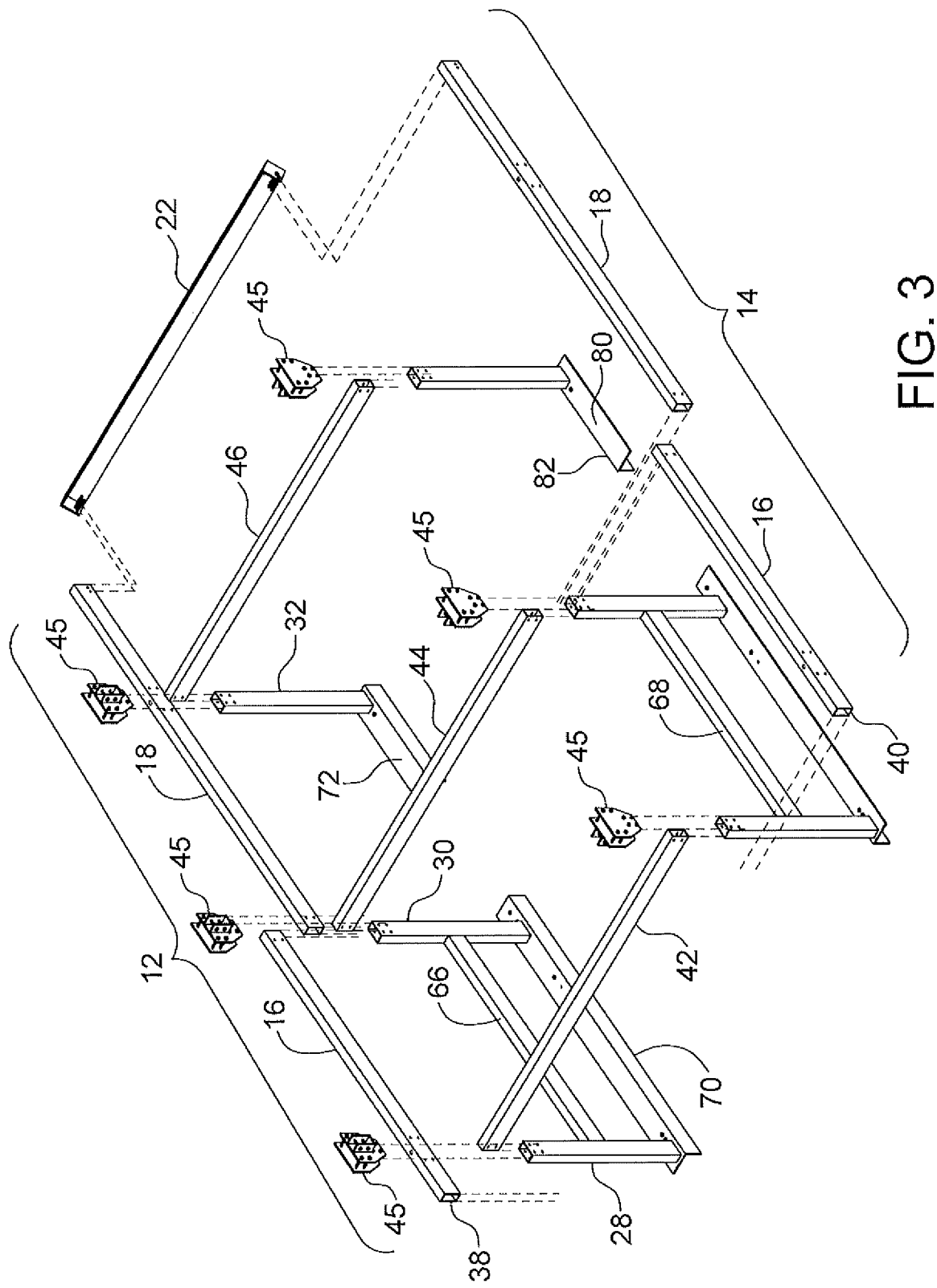
FIG. 3 is an exploded view of the truck rack of FIG. 1.

Referring now to FIGS. 1-3, the truck rack 10, shown with a pickup truck 11 in FIG. 1, and in detail in FIGS. 2 and 3, includes two spaced top or upper horizontal bars/assemblies 12 and 14 which extend for approximately the length of the pickup truck bed. The two top horizontal bar assemblies are spaced to be positioned on opposing sides of the pickup truck bed as described below and shown in the drawings. Each top horizontal bar assembly includes two longitudinal pieces 16 and 18. Piece 16 referred to as a rear piece, is in the embodiment shown 4'7" long, while piece 18, referred to as a front piece, is in the embodiment shown 5'11" long. The lengths of pieces 16 and 18 and the overall length of each top horizontal bar assembly can be varied to an extent and are thus approximate. Each front piece 18 of each top horizontal bar assembly terminates, in the embodiment shown, a small distance over the top of the pickup cab, approximately 2' in the embodiment shown, although again this distance can be varied.

Figure 4:
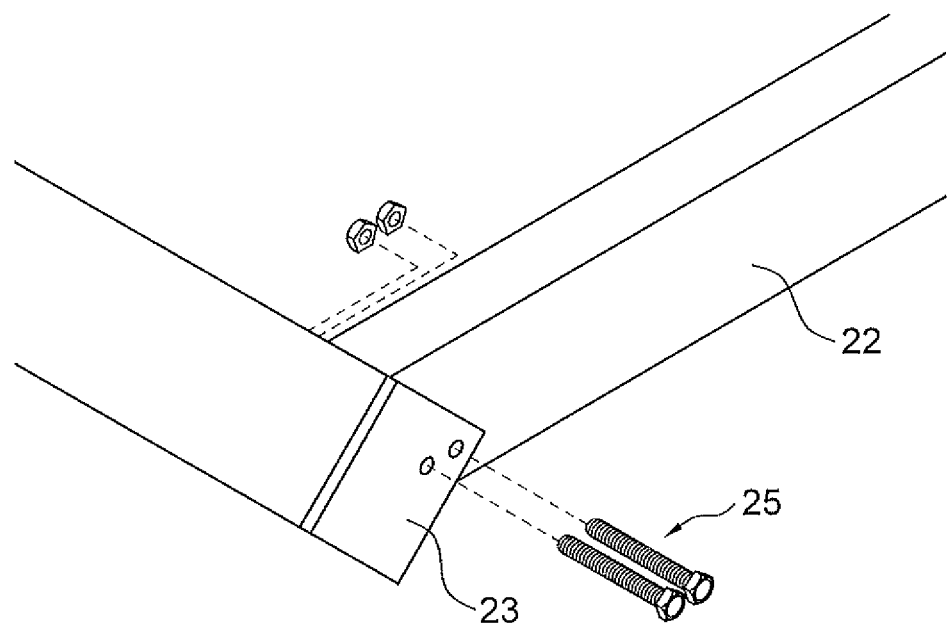
FIG. 4 is a perspective view of a forward portion of the truck rack.

In the present embodiment, the two top horizontal bar assemblies terminate in free ends. In an alternative embodiment shown in FIGS. 4, a front end bar 22 has square plates 23-23 welded to the ends thereof. End plates 23-23, approximately 3" square, are bolted, as shown by bolts 25, to the free end of the front end bar 22, provides additional stability to the front end of the truck rack.

In the embodiment shown, the two piece top horizontal bar assemblies 12 and 14, the front end bar 22 and the square plates 23-23 are all made of aluminum, although other materials can be used. The two piece top horizontal bar assemblies and the front end bar are tubular, 1½" by 3" by ⅛" thick, in the embodiment shown.

The truck rack 10 further includes three spaced vertical bars 28, 30 and 32, extending downwardly from each of the top horizontal bar assemblies. The vertical bars are each 2'4" in length and are conveniently attachable, respectively, to the top horizontal bar assemblies by bracket assemblies described in detail below. Vertical bar 28, the rearmost vertical bar, has a center line which is located approximately 9½" inches forwardly from the rear free ends 38 and 40 of the top horizontal bar assemblies 12 and 14. Vertical bar 30 has a center line which is located approximately 4'7½" inches forwardly from the rear free ends 38 and 40 of the top horizontal bar assemblies 12 and 14, while vertical bar 32 has a center line which is located approximately 8'7½" inches from the rear free ends 38 and 40 of the top horizontal bar assemblies 12 and 14 and is close to forward ends of the top horizontal bar assemblies. The vertical bars are 1½" by 3" by ⅛" aluminum tube.

Truck rack 10 also includes three cross bars 42, 44 and 46. Rear cross bar 42 is positioned approximately 9½" from the rear free ends 38 and 40 of the top horizontal bar assemblies, extending between top horizontal bar assemblies 12 and 14, and is coplanar with vertical bar 28. Cross bar 44 is positioned approximately 4'7½" from the rear free ends 38 and 40 of the horizontal bar assemblies, extending between top horizontal bar assemblies 12 and 14 and is coplanar with vertical bar 30. Cross bar 46 is positioned approximately 8'7½" from the free rear ends 38 and 40 of the top horizontal bar assemblies, extending between top horizontal bar assemblies 12 and 14 and is coplanar with vertical bar 32. The cross bars 42, 44 and 46 are aluminum tube 1½" by 3" by 3/16" in the embodiment shown. The dimensions of the cross bars and their position can be altered slightly, although they should be coplanar with their associated vertical bars.

Figure 5:
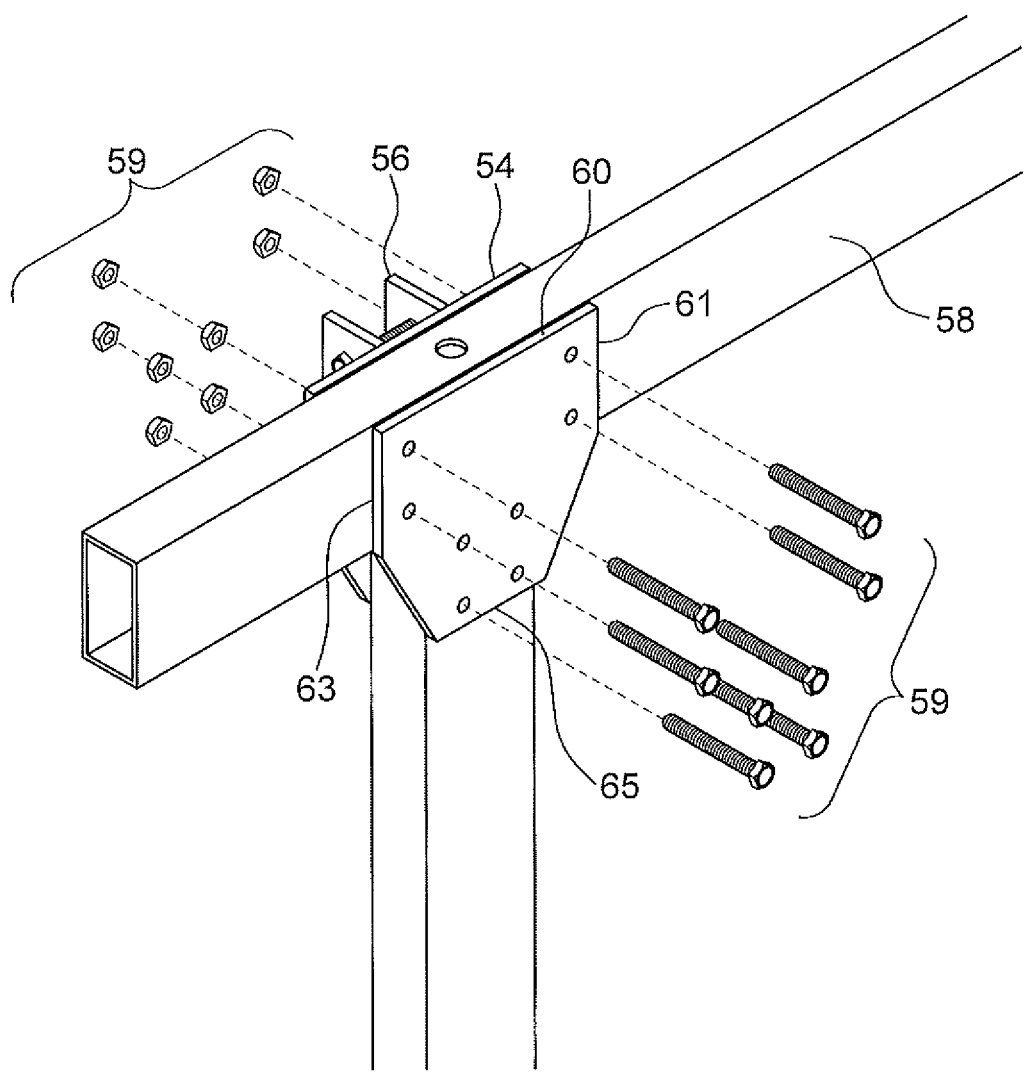
FIG. 5 is a first perspective view of the attachment assembly for the truck rack.
Figure 6:
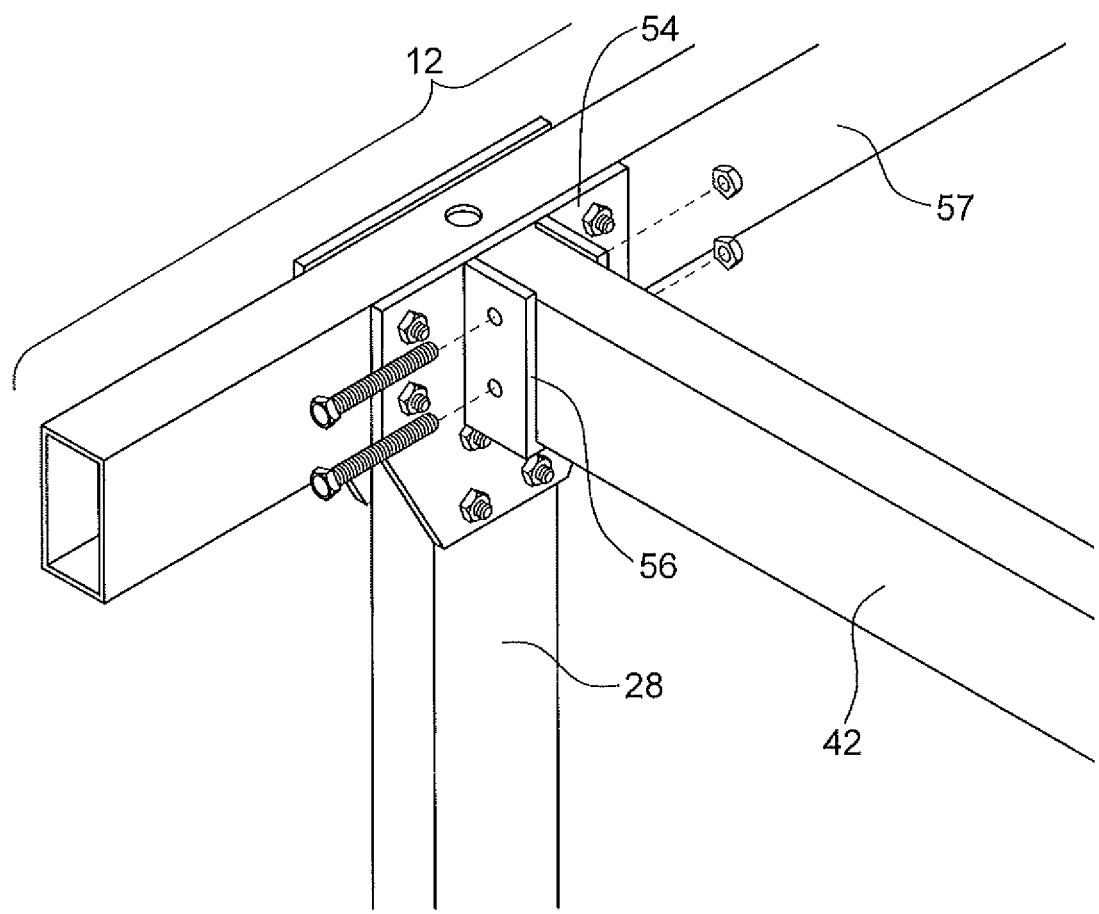
FIG. 6 is a second perspective view of the attachment assembly of the truck rack.

Connections between the top horizontal bar assemblies, the vertical bars and the cross bars are accomplished as follows, as shown generally at 45-45 in FIGS. 2 and 3 and in detail in FIGS. 5 and 6. Flat plates 47, 49 and 51 connect the vertical bars, respectively, to exterior sides 55 of the top horizontal bar assemblies. Brackets 48, 50 and 52 connect the cross bars to the interior sides 57 of the top horizontals bar assemblies, respectively. Plates 47, 49 and 51 connect to brackets 48, 50 and 52 by a plurality of through bolts and nuts 59-59, holding the top horizontal bar assemblies firmly between them. Brackets 48, 50 and 52 each comprises two bracket sub-pieces, 54 and 56, welded together. Bracket sub-piece 54 is a plate, identical to flat plates 47, 49 and 51. The flat plates of brackets 48, 50 and 52 and flat plates 47, 49 and 51 have the same configuration. Referring to FIG. 5, each flat plate has a top edge 60, approximately 6" long. Side edges 61 and 63 extend downwardly therefrom. Beginning 2" from the top edge, the side edges angle inwardly to a bottom edge 65, which is approximately 3" long. Bracket sub-piece 56 is welded to the surface of bracket sub-piece 54. Bracket sub-piece 56 is generally U-shaped, approximately 1½" wide by 3" deep, with the open end at the top edge thereof. Bracket sub-piece 56 is configured to firmly receive an end of a cross bar.

Truck rack 10 also includes mid level horizontal bars 66 and 68 as shown in FIGS. 2 and 3. The mid level horizontal bars in the embodiment shown are 3'7" and extend between vertical bars 28 and 30 on each side. The mid level horizontal bars are attached to the vertical bars 28 and 30 by welding. Each mid level bar 32 is also tubular aluminum 1½" by 3" by ⅛". The mid level horizontal bars are positioned approximately 1'2" below the upper horizontal bar assemblies. In the embodiment shown, there is no mid level horizontal bar extending between vertical bars 30 and 32.

Figure 7:
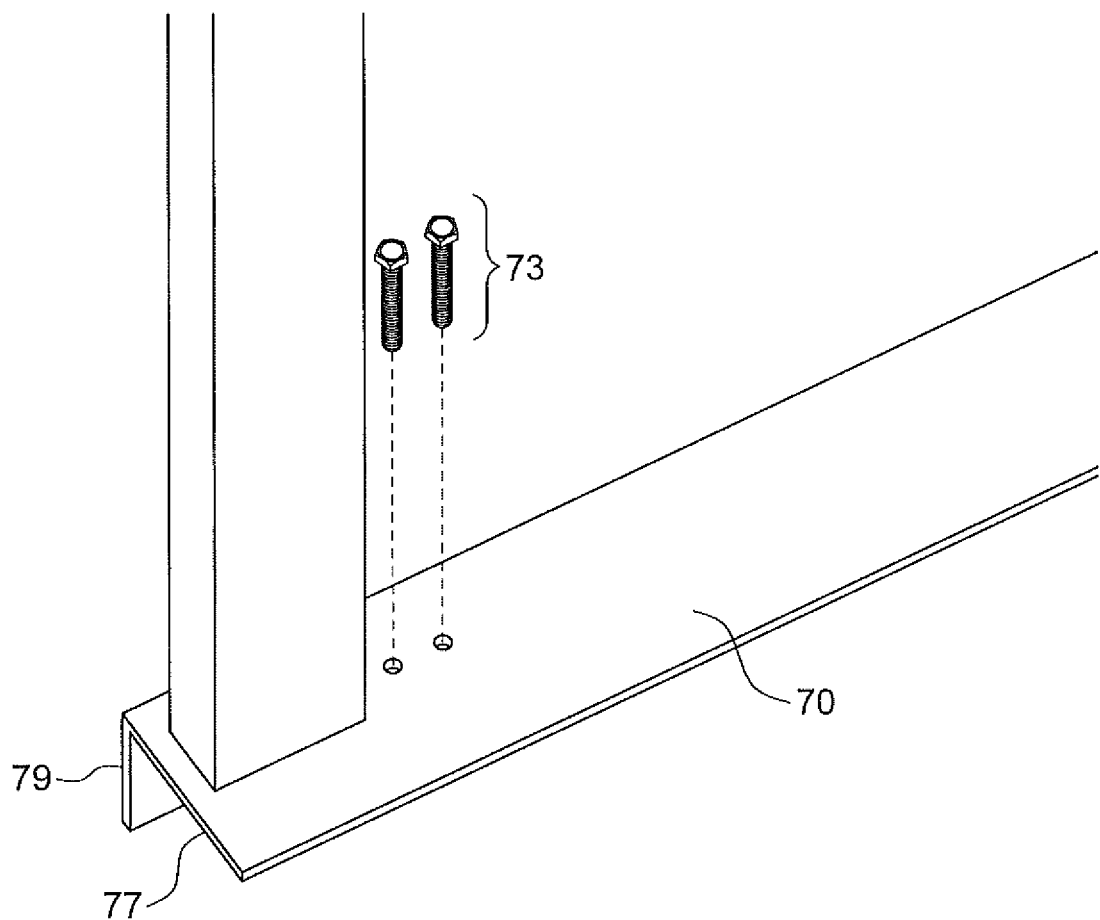
FIG. 7 is a perspective view showing connection of one vertical bar to the lower horizontal bar of the truck rack.

The truck rack 10 also includes two separate footing members 70 and 72 for each side of the truck rack, as shown in FIGS. 2, 3 and 7. Footing member 70, referred to as a first lower horizontal bar, associated with the top horizontal bar assemblies, is an angled (L-shaped) piece of aluminum having a length of 4'6" so that it extends forwardly of the truck rack a small distance, approximately 8" in the embodiment shown, beyond vertical member 30, as an example for one side, the far side, of the truck rack. Footing member 70 has a horizontal portion 77 approximately 4" wide, and a vertical portion 79 of 3½". Footing member 70 is welded to the lower ends of vertical members 28 and 30 at its horizontal surface 77. The horizontal surface 77 of the L-shaped footing member 70 is secured to the top outer edge of the truck bed by bolts 73, thereby securing the truck rack to the truck bed. Vertical portion 79 is positioned against the inner edge surface of the truck bed when the truck bed is in place. The same arrangement is for the near side of the truck rack in FIG. 2.

Footing member 72 is also aluminum in the embodiment shown and includes a horizontal portion 80 approximately 4" wide and a vertical portion 82 approximately 3½" wide. The vertical portion 82 is positioned against the inner edge of the truck bed, when the truck rack is in place in the truck bed. Footing member 72 extends rearwardly 1'8" from vertical bar 32 and rests on the outer top edge of the truck bed but is not attached to the truck bed in the embodiment shown, although this could be done if desired.

The above collection of elements, bars, and members comprise truck rack 10. As can be seen, the bolts/nuts connecting plates 47, 49 and 51 and brackets 48, 50 and 52 can be removed so that the cross bars can be removed, and so that the combination (from each side) of a rear piece of the top horizontal bar assemblies, two vertical bars, a mid level bar, and a footing member can be removed as units and with the three cross bars and other separate pieces of the truck rack can be stored or carried in a 3'×5' package, thereby defining a convenient kit of parts.

Although the preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A truck rack for pickup trucks, comprising:
two spaced top horizontal bar assemblies extending a length of the pickup truck bed, each horizontal bar assembly comprising first and second sections;
three vertical bars attached to each of the top horizontal bar assemblies and extending downwardly therefrom, the vertical bars positioned at spaced intervals along a length of the top horizontal bar assemblies;
three cross bars extending between the top horizontal bar assemblies at spaced intervals there along, coplanar with the vertical bars;
three attachment assemblies, the attachment assemblies each comprising an outer attachment piece, attachably securing an outer surface of each vertical bar to an outer surface of an associated top horizontal bar assembly and an inner attachment piece, attachably securing an inner surface of each vertical bar member to an inner surface of the associated top horizontal bar assembly, wherein the inner attachment piece includes an element configured to receive a free end of a cross bar;
two mid-level horizontal bars extending between and connected to first and second rearmost vertical bars attached to the top horizontal bar assemblies respectively;
a first lower horizontal bar extending between a lower end of each of a first rearmost vertical bar forwardly to at least a second rearmost vertical bar; and
a second lower horizontal bar extending rearwardly from each of a forward most vertical bar a distance rearwardly toward but not attached to the second rearmost vertical bar or the first lower horizontal bar.

2. The truck rack of claim 1, wherein the first lower horizontal bars are approximately 4'8" long, extending forwardly past the second rearmost vertical bar, and wherein the second horizontal bars are approximately 1'8" long, and wherein the first lower horizontal bars are attachable to a truck bed rail.

3. The truck rack of claim 1, wherein the first sections of the top horizontal bar assemblies are approximately 4'7" long, and wherein the second sections of the top horizontal bar assemblies are approximately 5'11" long.

4. The truck rack of claim 1, wherein the top horizontal bar assemblies, cross bars and the vertical bars are all aluminum tubes, approximately one and a half inches by three inches.

5. The truck rack of claim 1, wherein the mid-level horizontal bars are approximately 3'7" long and are attached at their free ends to the rearmost and next rearmost vertical bars approximately 1'2" below the top horizontal bar assemblies.

6. The truck rack of claim 1, wherein the vertical bars are attached to the lower horizontal bars by welding and wherein the mid-level horizontal bars are attached to the rearmost and second rearmost vertical bars by welding.

7. The truck rack of claim 1, wherein the outer and inner attachment pieces of the attachment assemblies are attached to the top horizontal bar assemblies by bolt and nut assemblies.

8. The truck rack of claim 1, wherein the first section of each top horizontal top assembly, the rearmost and next rearmost vertical bars and the first lower horizontal bar define a combination which, with the second section of each top horizontal bar assembly the cross bars and the second lower horizontal bar define a kit of parts which can be carried in a 3' by 5' container.

\* \* \* \* \*